United States Patent [19]

Lotsch et al.

[11] Patent Number: 4,645,539
[45] Date of Patent: * Feb. 24, 1987

[54] TRANSPARENT ISOINDOLINE PIGMENT HAVING A HIGH COLOR STRENGTH

[75] Inventors: Wolfgang Lotsch, Beindersheim; Georg Henning, Ludwigshafen, both of Fed. Rep. of Germany

[73] Assignee: BASF Aktiengesellschaft, Ludwigshafen, Fed. Rep. of Germany

[*] Notice: The portion of the term of this patent subsequent to Jul. 8, 2003 has been disclaimed.

[21] Appl. No.: 634,580

[22] Filed: Jul. 26, 1984

[30] Foreign Application Priority Data

Jul. 30, 1983 [DE] Fed. Rep. of Germany ....... 3327564

[51] Int. Cl.[4] .................... C09B 57/04; C09D 11/00; C09D 239/62; C09D 239/64
[52] U.S. Cl. ............................ 106/288 Q; 544/300
[58] Field of Search ............... 544/300, 301, 284, 287; 106/288 Q

[56] References Cited

U.S. PATENT DOCUMENTS

| | | | |
|---|---|---|---|
| 3,794,659 | 2/1974 | Leister et al. | 548/159 |
| 4,166,179 | 8/1979 | Lotsch | 524/89 |
| 4,262,120 | 4/1981 | von der Crone | 544/300 |
| 4,271,301 | 6/1981 | Lotsch et al. | 544/300 |
| 4,316,023 | 2/1982 | Henning et al. | 524/87 |
| 4,352,932 | 10/1982 | Lotsch et al. | 544/295 |

FOREIGN PATENT DOCUMENTS

| | | | |
|---|---|---|---|
| 0038548 | 4/1981 | European Pat. Off. | 544/300 |
| 2041999 | 3/1972 | Fed. Rep. of Germany | 544/300 |
| 2013230 | 8/1979 | United Kingdom | 544/300 |
| 1601555 | 10/1981 | United Kingdom | |

*Primary Examiner*—Donald G. Daus
*Assistant Examiner*—Stephen M. Kapner
*Attorney, Agent, or Firm*—Oblon, Fisher, Spivak, McClelland & Maier

[57] ABSTRACT

Novel pigmentary forms of isoindoline pigments which contain (a) a pigmentary form of the compound of the formula (I)

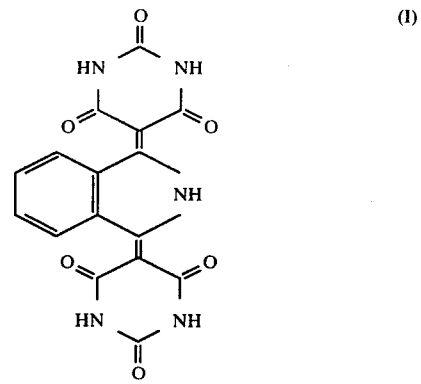

and (b) from 2 to 50% by weight, based on (I), of one or more isoindoline pigments of the formula (II)

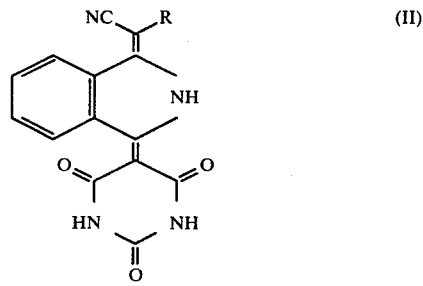

where R is —CN, —CONH$_2$, N—C$_1$-C$_4$-alkylcarbamyl, N-phenylcarbamyl, 2-quinazolonyl, 2-quinoxazolonyl and 2-benzimidazolyl, and the phenyl radical in the phenylcarbamyl and/or the heterocyclic radicals stated for R are unsubstituted or substituted, are obtained by heating a mixture of the finely divided pigments (I) and (II) in an aqueous medium.

Advantageously, the mixture is prepared directly by synthesizing (I) in the presence of finely divided (II) in water.

The novel pigmentary forms are transparent pigments which have high color strength, and whose transparency and color strength are substantially superior to those of very similar pigments.

11 Claims, No Drawings

TRANSPARENT ISOINDOLINE PIGMENT HAVING A HIGH COLOR STRENGTH

The present invention relates to a transparent isoindoline pigment having a high color strength.

Pigmentary forms of the isoindoline compound I

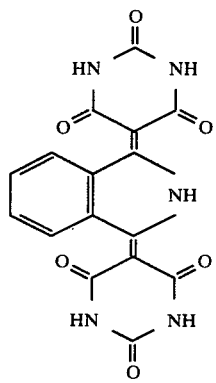

(I)

and its preparation are disclosed in German Laid-Open Application DOS No. 2,041,999, U.S. Pat. Nos. 4,166,179 and 4,271,301. and EP-A No. 38 548; These pigments are useful neutral to intensely reddish yellow pigments which, depending on the preparation conditions, possess high color strength and poor hiding power, or low color strength and good hiding power.

The high-hiding pigmentary forms of (I) which have lower color strength exhibit good weather-fastness in finishes and are very useful alternatives to inorganic pigments containing heavy metals. The pigmentary forms of (I) which have high color strength and a poorer hiding power are very useful for coloring thermoplastics. Regarding the use of the conventional pigmentary forms of (I) as alternative printing ink pigments to the transparent diarylide pigments of the type C. I. Pigment Yellow 12 and 13, which have high color strength, neither the color strength nor the transparency meet practical requirements. The weather-fastness of the conventional pigmentary forms of (I) having high color strength is not sufficient to permit their use in higher-grade finishes.

It is an object of the present invention to provide pigmentary forms of (I) which, compared with the prior art, are substantially more transparent and have a higher color strength, or have a high color strength and poor hiding power and are substantially more weather-fast.

We have found that this object is achieved, and that an isoindoline pigment has a high color strength and is transparent or has a poor hiding power, if it contains (a) a pigmentary form of the compound of the formula (I)

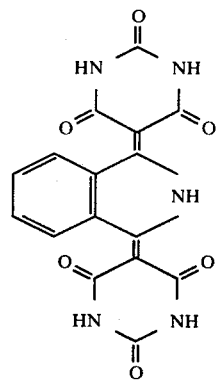

(I)

and
(b) from 2 to 50 % weight, based on (I), of one or more isoindoline pigments of the formula (II)

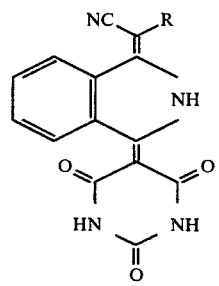

(II)

where R is —CN, —CONH$_2$, N—C$_1$-C$_4$-alkylcarbamyl, N-phenylcarbamyl, 2-quinazolonyl, 2-quinoxazolonyl or 2-benzimidazolyl, and the phenyl radical in the phenylcarbamyl and the heterocyclic radicals stated for R are unsubstituted or substituted by chlorine, bromine, fluorine, nitro, carbamyl, N—C$_1$-C$_4$-alkylcarbamyl, N-phenylcarbamyl, C$_1$-C$_4$-alkyl, C$_1$-C$_4$-alkoxy, benzoylamino, C$_1$-C$_4$-alkanoylamino, C$_1$-C$_4$-alkoxycarbonyl or phenoxycarbonyl, and the pigment is obtained by heating a mixture of the finely divided pigments (I) and (II) in an aqueous medium.

Suitable substituents for the phenyl radical and the heterocyclic radicals stated for R are those mentioned in the stated literature, e.g. chlorine, bromine, fluorine, nitro, carbamyl, N—C$_1$-C$_4$-alkylcarbamyl, N-phenylcarbamyl, C$_1$-C$_4$-alkyl, C$_1$-C$_4$-alkoxy, benzoylamino, C$_1$-C$_4$-alkanoylamino, C$_1$-C$_4$-alkoxycarbonyl and phenoxycarbonyl. Preferably, the heterocyclic radicals R are not further substituted, and the phenyl radical is unsubstituted or substituted by chlorine.

Compared with the pigmentary forms of (I) obtainable under the same conditions, the isoindoline pigment according to the present invention possesses substantially higher transparency and/or color strength and is very useful for the production of transparent printing inks, for example for printing packaging, or for the preparation of weather-fast finishes having high color strength. As in the case of pigmentary forms of (I) alone, mixtures obtained by mechanically mixing pigmentary forms of (I) having high color strength with pigments of the formula (II) result in, for example, printing inks which are too opaque or coatings which possess unsatisfactory weather-fastness. Mixtures obtained by mechanically mixing high-hiding pigmentary forms of (I) with pigments of the formula (II) give coatings which are weatherfast and high-hiding but not very intense.

The content of (b) can be varied within a wide range, and can be from 2 to 50 % by weight, based on (a). However, for tinctorial and economic reasons, the amount of (b) is preferably from 5 to 20, in particular from 10 to 20, % by weight, based on (I).

The pigments of the formula II are disclosed in U.S. Pat. Nos. 3,794,659; 4,316,023 and 4,352,932 and British Patent Nos. 2,013,230 and 1,601,555.

For tinctorial and performance-related reasons, preferred pigments (II) are those in which R is CONH$_2$, N—C$_1$-C$_4$-alkylcarbamyl, N-chlorophenylcarbamyl or 2-quinazolonyl, in particular —CONH$_2$, —CONH—CH$_3$, N-4-chlorophenylcarbamyl, N-3-chlorophenylcarbamyl or 2-quinazolonyl.

The novel pigmentary forms can be prepared by various methods:

(1) by mixing the individually prepared, finely divided pigments (I) and (II) in the form of the water-moist filter cakes, and subjecting the mixture to a heat treatment, for example as described in EP-A 38 548;

(2) by synthesizing (I) in the presence of finely divided (II) and heating to $\leq 100°$ C., for example as described in U.S. Pat. No. 4,166,179, Example 1;

(3) by synthesizing (I) in the presence of finely divided (II) and heating to above 100° C., for example as described in U.S. Pat. No. 4,166,179, Example 5;

(4) by carrying out the synthesis as described under (2), isolating the product and subsequently subjecting it to a heat treatment, for example as described in EP-A 38 548, Examples 2 and 5; and (5) by the action of shear forces on a mixture of the filter cakes of (I) and (II), followed by heat treatment, for example as described in U.S. Pat. No. 4,271,301.

Pigmentary forms having different tinctorial properties and performance characteristics are obtained, depending on the conditions employed.

For example, method (2), and especially method (5), give pigmentary forms which possess extremely high color strength and extremely high transparency. These pigmentary forms are very useful for pigmenting printing inks.

Pigmentary forms which have high color strength and high transparency coupled with good weather-fastness are obtained by methods (3) and (4), and in particular by method (1). These pigmentary forms are particularly useful for the mass-pigmenting of finishes and plastics.

The synthesis of (I) in the presence of finely divided (II) is carried out in a conventional manner, as described in U.S. Pat. No. 4,166,179, and, depending on the intended use, the product is after-treated at from 70° to 100° C. (method 2) or at above 100° C., advantageously from 120° to 150° C. (method 3), or the product is first isolated and stirred with water and then subjected to the heat treatment (method 4).

Methods (1) and (5) start from finely divided pigments (I) and (II). The heat treatment can be carried out at from 70° to 150° C. depending on whether it is intended to prepare a pigment possessing very high color strength and extremely high transparency, or a transparent pigment having high color strength and good weather-fastness. The preparation of the pigments according to the present invention can be carried out in the presence or absence of a surfactant.

The performance characteristics and/or tinctorial properties of the novel pigmentary forms can be further influenced by the choice of suitable isoindoline compounds (II). For example, using method (2) and compounds of the formula II, where R is carbamyl or N—C$_1$-C$_4$-alkylcarbamyl, preferably N-methylcarbamyl, a brilliant, greenish yellow, highly transparent pigment which has high color strength and is suitable for printing inks is obtained.

Isoindoline compounds of the formula II, where R is N-phenylcarbamyl substituted in the phenyl nucleus or is 2-quinazolonyl, give transparent reddish yellow to yellowish red pigments which have high color strength and good weather-fastness. In these compounds, chlorine is a preferred substituent in the phenyl nucleus, and R is particularly preferably 2-quinazolonyl.

The Examples which follow illustrate the invention. Parts are by weight.

EXAMPLE 1

3 parts of a pigment of the formula II, where R is 2-quinazolonyl, in the form of an aqueous suspension (prepared by condensing 1,3-diiminoisoindoline with 2-cyanomethylquinazolone in a molar ratio of 1:1 in methanol, reacting the isolated and dried 1:1 condensate with barbituric acid in glacial acetic acid at the boiling point, drying the resulting pigment and dispersing it in 50 parts of water for 2 hours on a vibratory mill containing glass balls), and 400 parts of water are added to 32.5 parts of pigment (I) in the form of the aqueous presscake (prepared as described in U.S. Pat. No. 4,166,179, Example 1), and the vigorously stirred mixture is heated to 30° C. and kept at this temperature for 7 hours. It is cooled to 80° C. after which the product is filtered off, washed with hot water and dried to give 32 parts of a pigment. When used to color finishes, this pigment gives very intense, weather-fast orange colorations.

Compared with the pigmentary form of (I) prepared under the same conditions but without the addition of (II), the novel pigmentary form has a much higher color strength, is much more transparent and has similar weather-fastness.

EXAMPLE 2

The procedure described in Example 1 is followed, except that, instead of 3 parts, only 1.5 parts of the stated pigment are used. 31 parts of a pigment are obtained. When used in finishes, this pigment gives very highly intense reddish yellow colorations having good weather-fastness.

EXAMPLE 3

The procedure described in Example 3 is followed, except that the aqueous suspension is heated at 130° C. for 14 hours. 31 parts of pigment are obtained. Compared with the pure pigmentary form of (I) prepared under otherwise identical conditions but in the absence of (II), this pigment gives, in finishes, much more intense orange colorations having good weather-fastness.

EXAMPLES 4 to 24

The procedure described in Example 1 is followed, except that the additional pigment used comprises 3 parts of an isoindoline compound of the formula (II), where R has the meaning stated in the table. The resulting pigments have high color strength and, when used in finishes, give colorations which possess good or very good weather-fastness and have the hues stated.

| Example | R | Hue |
|---|---|---|
| 4 | —C(=O)—NH—C₆H₄—Cl (4-Cl) | orange |
| 5 | —C(=O)—NH—C₆H₄—Cl (3-Cl) | yellow |
| 6 | —C(=O)—NH—C₆H₄—CH₃ (4-CH₃) | orange |
| 7 | —C(=O)—NH—C₆H₄—CH₃ (3-CH₃) | orange |
| 8 | —C(=O)—NH—C₆H₄—CH₃ (2-CH₃) | yellow |
| 9 | —C(=O)—NH—C₆H₃(CH₃)₂ (2,4-diCH₃) | brownish orange |
| 10 | —C(=O)—NH—C₆H₄—OCH₃ (4-OCH₃) | brownish orange |
| 11 | —C(=O)—NH—C₆H₄—OCH₃ (3-OCH₃) | orange |
| 12 | —C(=O)—NH—C₆H₃(CH₃)(Cl) | orange |
| 13 | —C(=O)—NH—C₆H₅ | yellow |
| 14 | —C(=O)—NH—C₆H₄—CO₂CH₃ (2-CO₂CH₃) | yellow |
| 15 | —C(=O)—NH—C₆H₄—NHCOCH₃ | brownish orange |
| 16 | —C(=O)—NH—C₆H₄—Br | orange |
| 17 | —C(=O)—NH—C₆H₄—NHCO—C₆H₅ | brownish orange |
| 18 | —C(=O)—NH—C₆H₄—CONH₂ (2-CONH₂) | yellow |
| 19 | —C(=O)—NH—C₆H₄—OCH₃ (2-OCH₃) | brownish orange |
| 20 | (quinoxalinone-fused structure) | brown |
| 21 | —CN | yellow |
| 22 | —CONHC₂H₅ | yellow |
| 23 | —CONHCH₃ | yellow |
| 24 | —CONH₂ | yellow |

EXAMPLE 25

12.8 parts of o-phthalodinitrile are suspended in 100 parts of ethylene glycol, and 3 parts of gaseous ammonia are passed in at 50° C. in the course of 3 hours. The resulting solution of 1-amino-3-iminoisoindolenine is added, in the course of half an hour, at room temperature, to a vigorously stirred suspension containing 27 parts of barbituric acid in a solution of 22 parts of the sodium salt of a $C_3$-$C_4$-alkylnaphthalenesulfonic acid, 22 parts of formic acid and 3 parts of a pigment of the formula II where R is N-methylcarbamyl (which has been dispersed for 2 hours beforehand in 50 parts of water on a vibratory mill, using glass balls) in 240 parts of water. Stirring is continued for one hour, after which the suspension is heated at the boil for 4 hours and then filtered while hot. The residue is washed neutral and assistant-free with warm water. It is also possible to reintroduce the residue into water, boil up the suspension for a short time and once again filter it while hot, in order rapidly and quantitatively to remove the excess acid and the assistant from the pigment. The residue is then washed with methanol and dried.

36 parts of a yellow pigment are obtained. Compared with the pigment obtainable as described in U.S. Pat.

No. 4,166,179, Example 1, this pigment gives brilliant colorations which are substantially greener and possess substantially higher transparency in printing inks.

EXAMPLE 26

The procedure described in Example 25 is followed, except that 10 g of a readily water-dispersible pigment of the formula (II) where R is N-methylcarbamyl are used. 42 parts of a yellow pigment having high color strength are obtained. Compared with the pure pigment (I) prepared in the absence of (II), this pigment gives much greener, purer and more transparent colorations in printing inks.

EXAMPLE 27

The procedure described in Example 25 is followed, except that 3 parts of the pigment of the formula II where R is carbamyl are used. 36 parts of a yellow pigment having properties similar to those of the pigment of Example 25 are obtained.

EXAMPLE 28

The procedure described in Example 25 is followed, except that the pigment (b) of the formula (II) where R is N-methylcarbamyl is added only after stirring has been continued for one hour but before heating to the boil. 36 parts of a yellow pigment are obtained. Compared with the pure pigment (I) prepared in the absence of (II), the pigment possesses higher color strength, a green and pure hue and higher transparency in printing inks, finishes and plastics.

EXAMPLE 29

The procedure described in Example 25 is followed, except that, as pigment (b), 3 parts of the isoindoline pigment of the formula II where R is N-phenylcarbamyl are used, the pigment being thoroughly dispersed in water beforehand. 36 parts of a reddish yellow pigment which has high color strength and gives brilliant transparent printing inks are obtained.

EXAMPLE 30

The procedure described in German Laid-Open Application DOS No. 2,800,815, Example 3, is followed, except that 27 parts of the pigment (I) prepared as described in German Laid-Open Application DOS No. 2,041,999, Example 1, are used as (a), and 3 parts of the pigment (II) in which R is carbamyl, prepared as described in U.S. Pat. No. 3,794,659, Example 76, are used as (b). Compared with pure (I), the resulting pigment gives greener colorations which are more intense and more transparent. The novel pigment is very useful for coloring printing inks, finishes and plastics.

USE EXAMPLE 1

Finish 10 parts of the pigment obtained as described in Example 1 and 95 parts of a baking finish mixture which contains 70 % of coconut alkyd resin (60% strength solution in xylene) and 30% of melamine resin (about 55% strength solution in butanol/xylene) are milled in an attrition mill. After application and baking for 30 minutes at 120° C., yellowish red full-shade coatings having good lightfastness and fastness to overspraying are obtained. Admixing titanium dioxide gives orange white reductions.

If the pigments obtained as described in Examples 2 to 24 are used, coatings of the stated hues and with similar properties are obtained.

USE EXAMPLE 2

Plastic 0.5 part of the pigment obtained as described in Example 1 is applied onto 100 parts of standard-grade polystyrene granules by tumbling, and the colored granules are homogenized by extrusion at from 190° to 195° C. Lightfast yellowish red extrudates are obtained.

If a mixture consisting of 0.5 part of pigment and 1 part of titanium dioxide is used, opaque, yellowish red colorations are obtained.

If the pigments obtained as described in Examples 2 to 30 are used, very lightfast colorations are obtained in the stated hues.

USE EXAMPLE 3

Printing ink 8 parts of the pigment obtained as described in Example 25, 40 parts of a colophony resin modified with phenol/formaldehyde, and from 55 to 65 parts of toluene are mixed thoroughly in a dispersing unit. The resulting yellow toluene-based gravure printing ink gives highly transparent, lightfast prints. Similar results are obtained if the pigments obtained as described in Examples 26, 27, 28 and 30 are used.

We claim:

1. A transparent isoindoline pigment having high color strength and containing
   (a) a pigmentary form of the compound of the formula

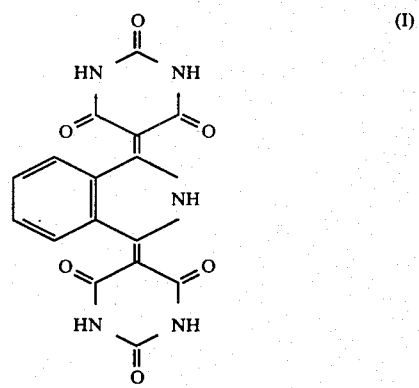

and
   (b) from 2 to 50 % by weight, based on (I), of one or more isoindoline pigments of the formula

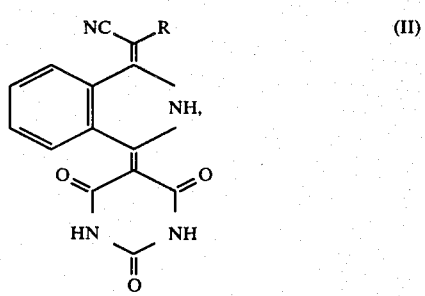

where R is —CN, —CONH$_2$, N—C$_1$-C$_4$-alkylcarbamyl, N-phenylcarbamyl, 2-quinazolonyl, 2-quinoxazolonyl or 2benzimidazolyl, and the phenyl radical in the phenylcarbamyl and/or the heterocyclic radicals stated for R are unsubstituted or substituted by chlorine, bromine, fluorine, nitro, carbamyl, N—C$_1$-C$_4$-alkylcarbamyl, N-phenylcarbamyl, C$_1$-C$_4$-alkyl, C$_1$-C$_4$-alkoxy, benzoylamino, C$_1$-C$_4$-alkanoylamino, C$_1$-C$_4$-alkoxycarbonyl or phenoxycarbonyl, where the pigment is obtained by heating a mixture of finely divided pigments (I) and (II) in an aqueous medium at from 70° to 150° C.

2. The isoindoline pigment as claimed in claim 1, wherein said isoindoline pigment of formula II is a pigment wherein R is —CONH$_2$,N—C$_1$-C$_4$-alkylcarbamyl, unsubstituted or chlorine-substituted phenylcarbamyl or 2-quinazolonyl.

3. The isoindoline pigment as claimed in claim 1, wherein said isoindoline pigment of formula II is a pigment wherein R is —CONH$_2$,—CONH—CH$_3$, N-(4-chlorophenyl)-carbamyl, N-(3-chlorophenyl)-carbamyl or 2-quinazolonyl.

4. The isoindoline pigment as claimed in claim 1, which contains from 10 to 20 % by weight of (b), based on (a).

5. The isoindoline pigment as claimed in claim 2, which contains from 10 to 20% by weight of (b), based on (a).

6. The isoindoline pigment as claimed in claim 3, which contains from 10 to 20% by weight of (b), based on (a).

7. The transparent isoindoline pigment having high color strength and containing (a) a pigmentary form of the isoindoline compound of the formula

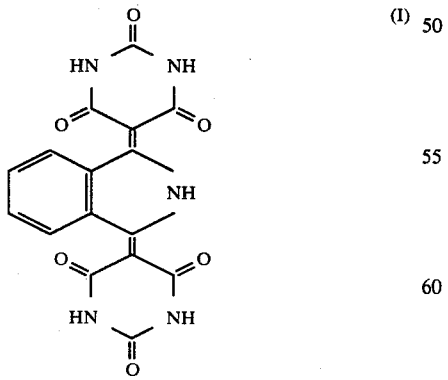

(I)

and (b) from 10 to 20% by weight, based on (a), of one or more isoindoline pigments of the formula

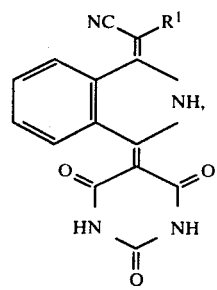

(IIa)

where R$^1$ is —CONH$_2$, —CONH—CH$_3$, N-(3-chlorophenyl)carbamyl, N-(4-chlorophenyl)-carbamyl or 2-quinazolyl, where the pigment is obtained by synthesizing (I) in the presence of finely divided (IIa) in an aqueous medium and then heating the aqueous suspension at from 70° to 150° C.

8. A transparent isoindoline pigment as claimed in claim 7, which contains, as (b), an isoindoline pigment of the formula (IIa), where R$^1$ is 2-quinazolyl.

9. A process for the preparation of a transparent isoindoline pigment having high color strength, wherein a mixture of (a) the finely divided pigmentary form of the compound of the formula

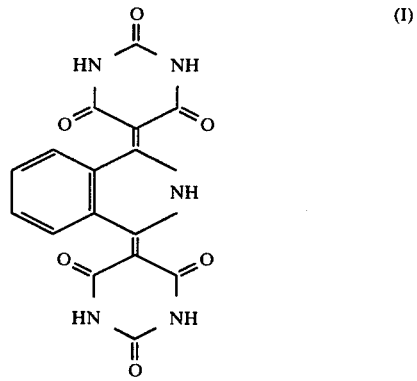

(I)

and
(b) from 2 to 50 % by weight, based on (I), of one or more isoindoline pigments of the formula

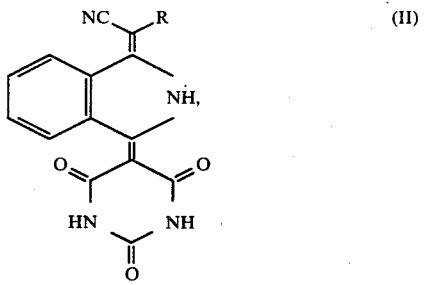

(II)

where R is —CN, —CONH$_2$, N—C$_1$-C$_4$-alkylcarbamyl, N-phenylcarbamyl, 2-quinazolonyl, 2-quinoxazolonyl or 2benzimidazolyl, and the phenyl radical in the phenylcarbamyl and the heterocyclic radicals stated for R are unsubstituted or substituted by chlorine, bromine, fluorine, nitro, carbamyl, N—C$_1$-C$_4$-alkylcarbamyl, N-phenylcarbamyl, C$_1$-C$_4$-alkyl, C$_1$-C$_4$-alkoxy, benzoylamino, C$_1$-C$_4$-alkanoylamino, C$_1$-C$_4$-alkoxycarbonyl or phenoxycarbonyl, is heated in water or in an aqueous medium, and the pigment is isolated.

10. A process as claimed in claim 9, wherein the mixture of (I) and (II) is heated in water at from 70° to 150° C.

11. A process as claimed in claim 9, wherein the finely divided pigment (I) is prepared in the presence of finely divided (II) by condensation of 1,3-diiminoisoindoline with barbituric acid in a molar ratio of 1:3, the resulting suspension is heated in water and the pigment is isolated.

* * * * *